US012650957B2

(12) United States Patent
Qiu et al.

(10) Patent No.: US 12,650,957 B2
(45) Date of Patent: Jun. 9, 2026

(54) METHOD, APPARATUS, DEVICE AND MEDIUM FOR MANAGING AN ELEMENT IN ELECTRONIC BOOK

(71) Applicant: Beijing Bytedance Network Technology Co., Ltd., Beijing (CN)

(72) Inventors: Zhenyuan Qiu, Beijing (CN); Weijian Xie, Beijing (CN); Wei Peng, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 18/837,081

(22) PCT Filed: May 16, 2023

(86) PCT No.: PCT/CN2023/094436
§ 371 (c)(1),
(2) Date: Aug. 8, 2024

(87) PCT Pub. No.: WO2023/231760
PCT Pub. Date: Dec. 7, 2023

(65) Prior Publication Data
US 2026/0119461 A1     Apr. 30, 2026

(30) Foreign Application Priority Data
Jun. 1, 2022    (CN) .......................... 202210622381.1

(51) Int. Cl.
*G06F 17/00* (2019.01)
*G06F 7/00* (2006.01)
(Continued)

(52) U.S. Cl.
CPC ............ *G06F 16/185* (2019.01); *G06F 16/13* (2019.01)

(58) Field of Classification Search
CPC ............................... G06F 16/185; G06F 16/13
(Continued)

(56) References Cited

U.S. PATENT DOCUMENTS 7,305,612 B2 * 12/2007 Chakraborty ......... G06F 40/143
715/780
9,189,461 B2 * 11/2015 Déjean .................. G06F 18/231
(Continued)

FOREIGN PATENT DOCUMENTS

CN        101515272 A      8/2009
CN        102135952 A      7/2011
(Continued)

OTHER PUBLICATIONS

Office action received from Chinese patent application No. 202210622381.1 mailed on May 22, 2024, 21 pages (13 pages English Translation and 8 pages Original Copy).
(Continued)

*Primary Examiner* — Pavan Mamillapalli

(57) ABSTRACT

According to implementations of this disclosure, a method, an apparatus, a device and a medium for managing an element in an electronic book are provided. In one method, a block node is generated based on a paragraph in the electronic book, the paragraph comprises at least one element, and the at least one element is comprised at least one of a text element or a non-text element. A text sub node of the block node is generated based on a text element included in the paragraph, and the text element includes at least one character. A non-text sub node of the block node is generated based on a non-text element included in the paragraph. A hierarchical structure for identifying the at least one element is generated based on the block node, the text sub node, and the non-text sub node.

18 Claims, 5 Drawing Sheets

(51) Int. Cl.
  *G06F 16/13* (2019.01)
  *G06F 16/185* (2019.01)

(58) Field of Classification Search
  USPC ......................................................... 707/741
  See application file for complete search history.

(56) References Cited

U.S. PATENT DOCUMENTS

| | | | |
|---|---|---|---|
| 2004/0194035 A1* | 9/2004 | Chakraborty | G06F 40/134 |
| | | | 715/228 |
| 2010/0030752 A1 | 2/2010 | Goldentouch | |
| 2010/0092088 A1 | 4/2010 | Roman | |
| 2014/0115436 A1 | 4/2014 | Beaver et al. | |
| 2015/0033116 A1 | 1/2015 | McKinney et al. | |
| 2016/0063322 A1* | 3/2016 | Déjean | G06V 30/40 |
| | | | 382/176 |
| 2022/0129494 A1* | 4/2022 | Mallick | G06F 16/172 |

FOREIGN PATENT DOCUMENTS

| | | | |
|---|---|---|---|
| CN | 102317933 A | 1/2012 |
| CN | 103049544 A | 4/2013 |
| CN | 104199975 A | 12/2014 |
| CN | 105205077 A | 12/2015 |
| CN | 110020279 A | 7/2019 |
| CN | 107170309 B | 2/2020 |
| CN | 111046096 A | 4/2020 |
| CN | 114118070 A | 3/2022 |
| CN | 114996212 A | 9/2022 |
| JP | 2013-069008 A | 4/2013 |

OTHER PUBLICATIONS

Notice of registration procedures received from Chinese patent application No. 202210622381.1 mailed on Jul. 24, 2024, 6 pages (2 pages English Translation and 4 pages Original Copy).

Zhao et al., "Adaptive Web Information Extraction Based on DOM Tree", Computer Science, vol. 36, No. 7, Jul. 2009, pp. 1-4.

* cited by examiner

700

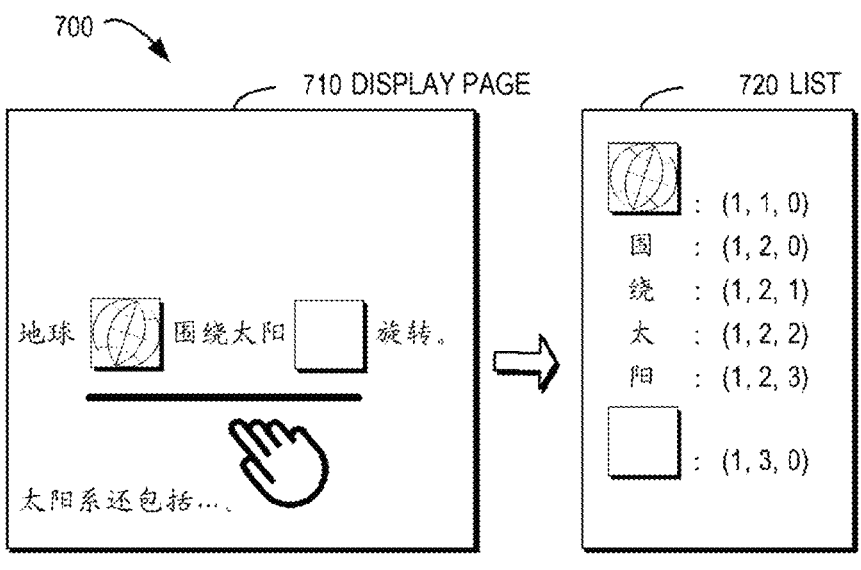

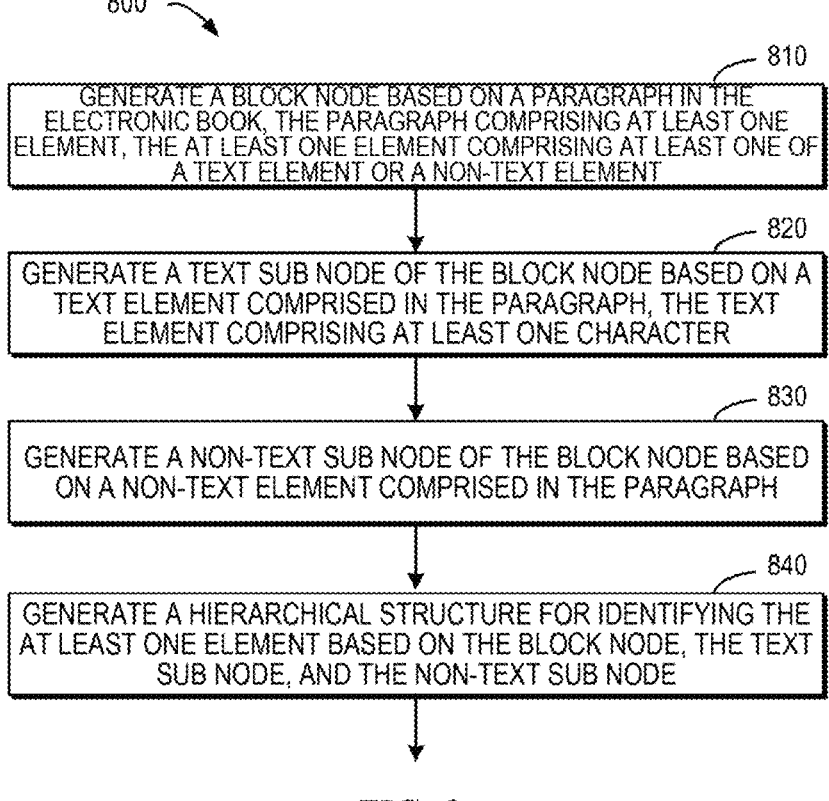

810
GENERATE A BLOCK NODE BASED ON A PARAGRAPH IN THE ELECTRONIC BOOK, THE PARAGRAPH COMPRISING AT LEAST ONE ELEMENT, THE AT LEAST ONE ELEMENT COMPRISING AT LEAST ONE OF A TEXT ELEMENT OR A NON-TEXT ELEMENT

820
GENERATE A TEXT SUB NODE OF THE BLOCK NODE BASED ON A TEXT ELEMENT COMPRISED IN THE PARAGRAPH, THE TEXT ELEMENT COMPRISING AT LEAST ONE CHARACTER

830
GENERATE A NON-TEXT SUB NODE OF THE BLOCK NODE BASED ON A NON-TEXT ELEMENT COMPRISED IN THE PARAGRAPH

840
GENERATE A HIERARCHICAL STRUCTURE FOR IDENTIFYING THE AT LEAST ONE ELEMENT BASED ON THE BLOCK NODE, THE TEXT SUB NODE, AND THE NON-TEXT SUB NODE

METHOD, APPARATUS, DEVICE AND MEDIUM FOR MANAGING AN ELEMENT IN ELECTRONIC BOOK

This application claims priority to Chinese Patent Application No. 202210622381.1, filed Jun. 1, 2022, entitled "METHOD, APPARATUS, DEVICE AND MEDIUM FOR MANAGING AN ELEMENT IN ELECTRONIC BOOK".

FIELD

Example implementations of the present disclosure generally relate to the field of electronic books, and in particular, to a method, apparatus, device and medium for managing an element in an electronic book.

BACKGROUND

With the development of digitization technologies, paper books have been converted into electronic books and electronic books are displayed in reading applications for providing electronic book reading services. The reader may read the content in the electronic book via a reading application. An electronic book may include multiple elements, for example, a text element may include the content in multiple languages, and a non-text element may include an image and a video, etc. During reading, the reader may select (e.g., line, block selection, etc.) some portion of the electronic book to highlight and/or add comment. When the selected content relates to a non-text element, it is difficult to identify the selected content. At this point, how to identify various elements in an electronic book becomes an urgent problem to be solved.

SUMMARY

In a first aspect of the present disclosure, a method for managing an element in an electronic book is provided. In the method, a block node is generated based on a paragraph in the electronic book, the paragraph comprises at least one element, and the at least one element is comprised at least one of a text element or a non-text element. A text sub node of the block node is generated based on a text element included in the paragraph, and the text element includes at least one character. A non-text sub node of the block node is generated based on a non-text element included in the paragraph. A hierarchical structure for identifying the at least one element is generated based on the block node, the text sub node, and the non-text sub node.

In a second aspect of the present disclosure, an apparatus for managing an element in an electronic book is provided. The apparatus includes: a node generation module configured to generate a block node based on a paragraph in the electronic book, the paragraph comprising at least one element, the at least one element comprising at least one of a text element or a non-text element; a text sub node generation module configured to generate a text sub node of the block node based on a text element comprised in the paragraph, the text element comprising at least one character; a non-text sub node generation module configured to generate a non-text sub node of the block node based on a non-text element comprised in the paragraph; and a hierarchical structure generation module configured to generate a hierarchical structure for identifying the at least one element based on the block node, the text sub node, and the non-text sub node.

In a third aspect of the present disclosure, an electronic device is provided. The electronic device includes: at least one processing unit; and at least one memory coupled to the at least one processing unit and storing instructions for execution by the at least one processing unit, the instructions, when executed by the at least one processing unit, causing the device to perform the method according to the first aspect of the present disclosure.

In a fourth aspect of the present disclosure, there is provided a computer readable storage medium having stored thereon a computer program which, when executed by a processor, causes the processor to implement the method according to the first aspect of the present disclosure.

It should be understood that the content described in the SUMMARY part of the present disclosure is not intended to limit the key features or important features of the implementations of the present disclosure, nor is it intended to limit the scope of the present disclosure. Other features of the present disclosure will become easily understood from the following description.

BRIEF DESCRIPTION OF DRAWINGS

The above and other features, advantages, and aspects of the various implementations of the present disclosure will become more apparent from the following detailed description taken in conjunction with the accompanying drawings. In the drawings, the same or similar reference numbers refer to the same or similar elements, wherein:

FIG. 7 shows a block diagram of a process for determining a reader selection element according to some implementations of the present disclosure;

FIG. 8 shows a flowchart of a method for managing an element in an electronic book according to some implementations of the present disclosure;

DETAILED DESCRIPTION

Figure 1:
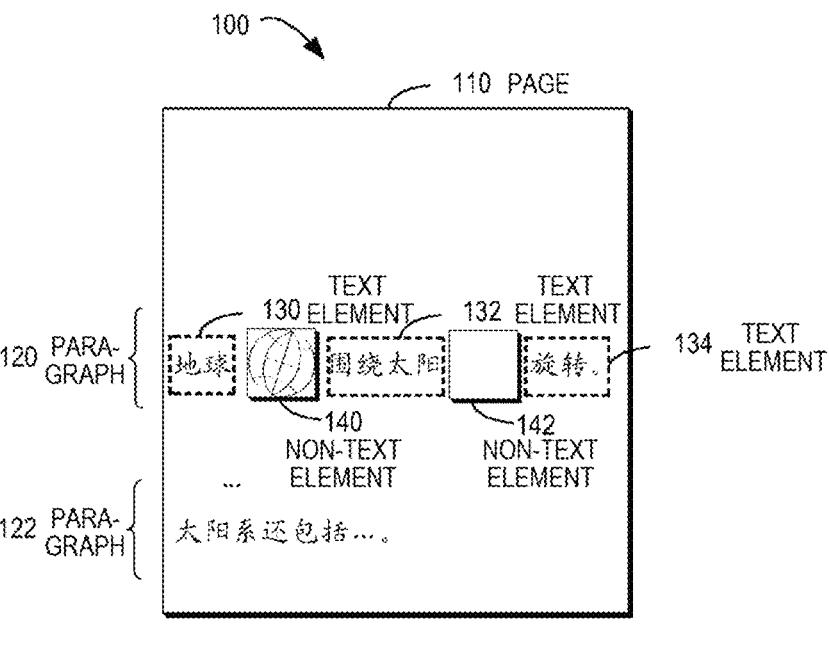
FIG. 1 illustrates a block diagram of an example environment in which the implementations of the present disclosure can be implemented.

Implementations of the present disclosure will be described in more detail below with reference to the accompanying drawings. Although some implementations of the present disclosure are shown in the drawings, it would be appreciated that the present disclosure can be implemented in various forms and should not be interpreted as limited to the implementations described herein. On the contrary, these implementations are provided for a more thorough and complete understanding of the present disclosure. It would be appreciated that the drawings and implementations of the present disclosure are only for illustrative purposes and are not intended to limit the scope of protection of the present disclosure.

In the description of the implementations of the present disclosure, the term "including" and similar terms should be understood as open-ended inclusion, that is, "including but not limited to". The term "based on" should be understood as "at least partially based on". The terms "one implementation" or "the implementation" should be understood as "at least one implementation". The term "some implementations" should be understood as "at least some implementations". The following may also include other explicit and implicit definitions. As used herein, the term "model" can represent the association relationship between various data. For example, the above-mentioned association relationship can be obtained based on various technical solutions currently known and/or to be developed in the future.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various implementations of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that execute operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

Example Environment

FIG. 1 illustrates a block diagram of an example environment 100 in which implementations of the present disclosure can be implemented. As shown in FIG. 1, an electronic book may be displayed in a page 110, and the electronic book may include a plurality of paragraphs 120, . . . 122. Taking a paragraph 120 as an example, the paragraph 120 may include a plurality of elements: a text element 130, a text element 132, and a text element 134, a non-text element 140 and a non-text element 142. During reading, a reader may select certain elements in the electronic book, although technical solutions for selecting text elements have been currently provided, however, if the selected content is a non-text element and/or the selected content includes a non-text element, the selected content cannot be correctly identified. At this point, it is desirable to more accurately identify various elements (e.g., text elements and/or non-text elements) in the electronic book.

Summary of Element Management

Figure 2:
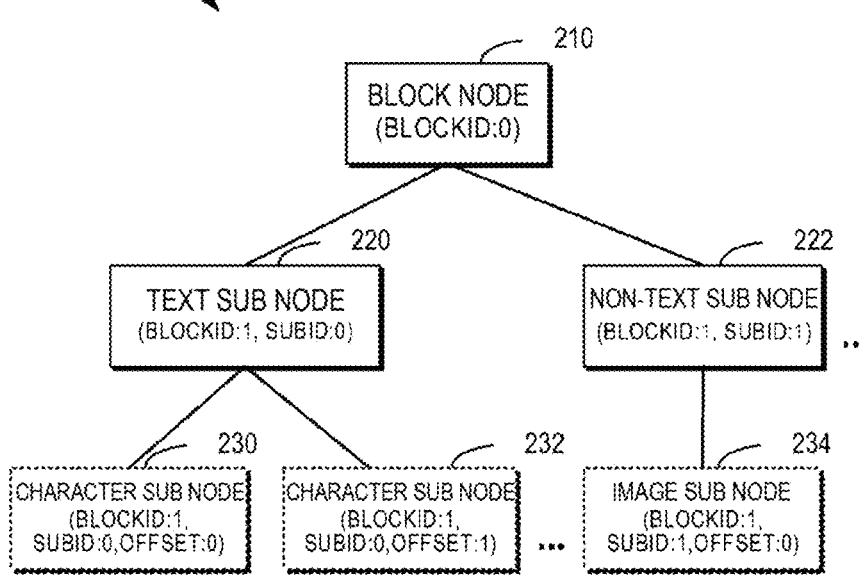
FIG. 2 illustrates a block diagram of a hierarchical structure for managing an element in an electronic book according to some implementations of the present disclosure.

To solve the deficiencies in the foregoing technical solutions, a technical solution for managing an element in an electronic book is provided. Hereinafter, a summary according to an example implementation of the present disclosure will be described with reference to FIG. 2. FIG. 2 illustrates a block diagram of a hierarchical structure 200 for managing an element in an electronic book in accordance with some implementations of the present disclosure. As shown in FIG. 2, a block node 210 may be generated for the paragraph 120 in the electronic book, and further, various elements in the paragraph 120 may be identified, and corresponding sub nodes are established for different types of elements. Specifically, a text sub node 220 may be established for the text element 130, and a non-text sub node 222 may be established for the non-text element 140, and so on. Although not shown in FIG. 2, other elements in the paragraph 120 may continue to be processed to establish corresponding sub nodes for the text element 132, the non-text element 142, and the text element 134, respectively.

According to one example implementation of the present disclosure, identifiers of nodes of various hierarchy in the hierarchical structure 200 may be set in an incremental manner. For example, the identifier of the block node 210 may be set as BLOCKID: 0. Since the block node 210 is located at a higher level, a primary identifier may be utilized to indicate. For the lower-layer text sub node 230 and the non-text sub node 222, a second level identifier may be employed to represent. For example, the first-level identifier of the lower-layer sub node may be set as BLOCKID: 1. Further, each sub node may be distinguished by a sub node identifier (SUBID) of the second level. At this time, the text sub node 220 may have a second level identifier (BLOCKID: 1, SUBID: 0), and the non-text sub node 222 may have a second level identifier (BLOCKID: 1, SUBID: 1).

With example implementations of the present disclosure, various elements in the electronic book may be represented based on the hierarchical structure 200. In this way, with the identifier described above, the text element and the non-text element in the electronic book can be accurately located in a unified manner, thereby facilitating subsequent processing on the electronic book.

According to an example implementation of the present disclosure, if the text element includes a plurality of consecutive characters, a corresponding character sub node may be further generated for each character. In the case where the text element 130 includes two characters "地球", as shown in FIG. 2, a corresponding character sub node 230 may be generated for a first character "地" in the text element 130, and a corresponding character sub node 232 may be generated for a second character "球" in the text element 130. At this point, the character sub nodes 230 and 232 are subordinate sub node of the text sub node 220.

Specifically, each character may be further identified by using an offset of each character in the text element 130. At this time, a three-level identifier (BLOCKID: 1, SUBID: 0, OFFSET: 0) may be used to represent the character "地", and a three-level identifier (BLOCKID: 1, SUBID: 0, OFF-SET: 1) may be used to represent the character "球". Further, the non-text element 134 includes only a single image, at this point, the offset of the image element may be set as 0 (OFFSET: 0). The three-level identifier of the image sub node 234 may be represented as (BLOCKID: 1, SUBID: 1, OFFSET: 0). With example implementations of the present disclosure, each character and image (or video) in the electronic book may be accurately distinguished, and a unified three-level identifier may be utilized to uniquely represent each element in the electronic book.

More Details of Element Management

Figure 3:
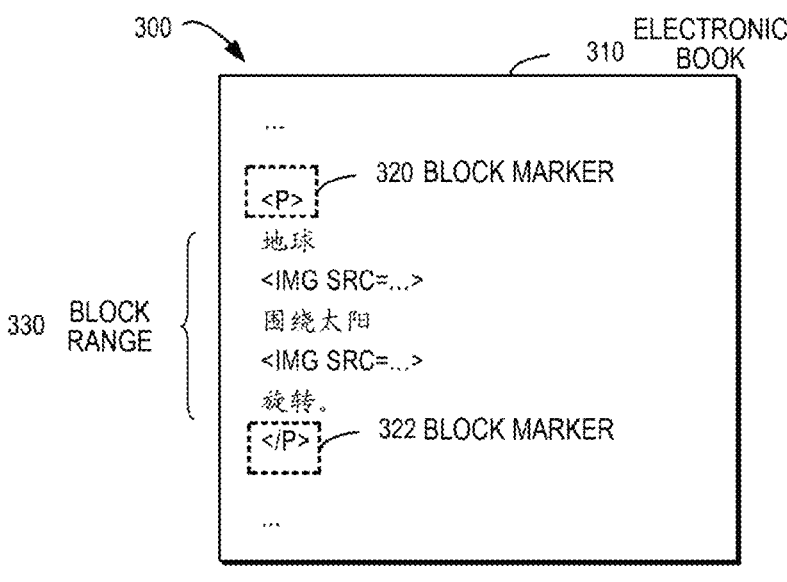
FIG. 3 illustrates a block diagram of an electronic book according to some implementations of the present disclosure.

A summary of an example implementation according to the present disclosure has been described with reference to FIG. 2, and in the following, FIG. 3 describes how to generate a corresponding hierarchical structure for an electronic book. Generally, electronic books are stored in a manner similar to HTML (Hypertext Markup Language). FIG. 3 illustrates a block diagram 300 of an electronic book according to some implementations of the present disclosure. For simplicity of description, FIG. 3 only illustrates a portion of the electronic book 310 associated with the paragraph 120, other paragraphs may be processed in a similar manner, and details are not described herein again. A concept of a block is defined in an HTML specification, and a block may be considered to correspond to a paragraph. A block occupies an entire horizontal space of a container and occupies a certain vertical space, thereby defining a block range. In the format specification of an electronic book, a block is defined using a block marker (e.g., p or div, etc.). At this point, a block marker in the electronic book may be identified, thereby identifying a paragraph in the electronic book.

According to an example implementation of the present disclosure, a block marker may be detected in the electronic book 310. For example, an electronic book 310 includes a block marker 320 (indicating a beginning portion of the block) and a block marker 322 (indicating an end portion of the block). According to an example implementation of the present disclosure, since blocks in the electronic book correspond to paragraphs in the displayed electronic book. By identifying the block marker in the electronic book, various paragraphs in the electronic book can be determined in a simple and effective manner. Further, a block node may be established for each paragraph in a similar manner, thereby representing each element in each paragraph with a multi-level identifier.

Specifically, the portion between the block marks 320 and 322 may be used as a block range 330, and the content in the block range 330 corresponding to the block marks 320 and 322 may be identified as the content of the paragraph. Further, the block node 210 directed to the paragraph 120 may be generated based on the paragraph 120 specified by the block range 330.

Figure 4:
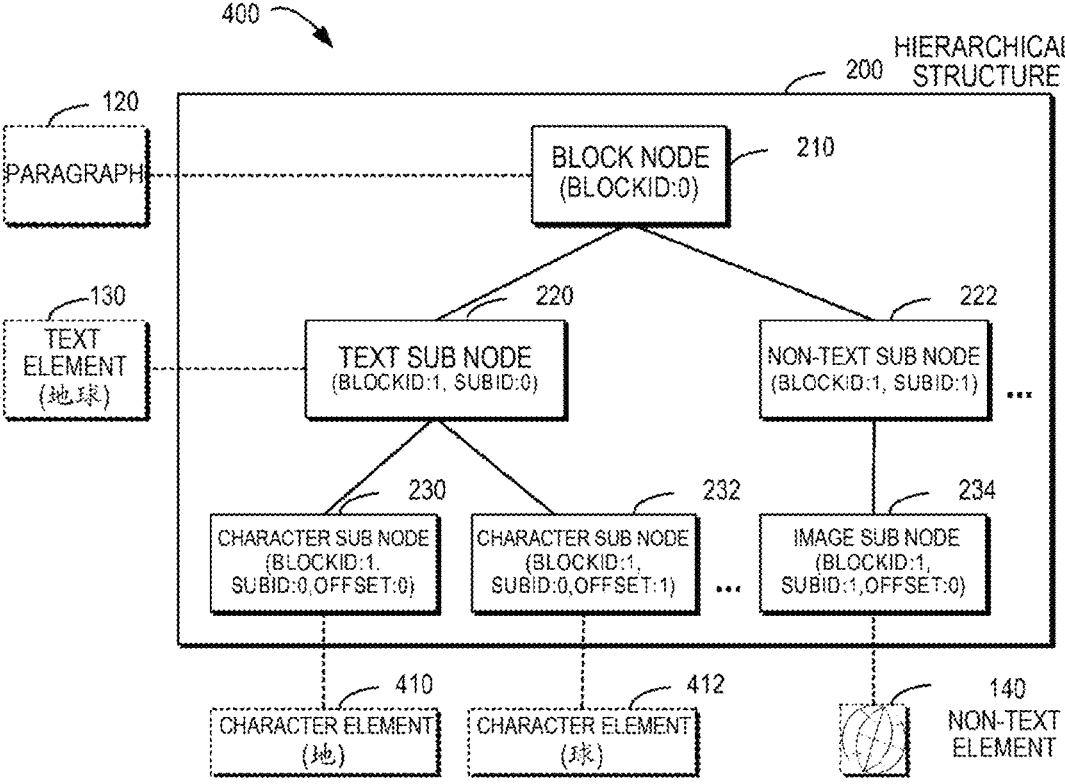
FIG. 4 illustrates a block diagram of a relationship between hierarchical structure and paragraphs of an electronic book according to some implementations of the present disclosure.

It will be appreciated that the electronic book may include text elements and non-text elements. In the case where a paragraph has been determined, each element in the paragraph may be scanned one by one, and a corresponding process is performed. Hereinafter, the specific process of generating the hierarchical structure 200 for the paragraph 120 will be described with reference to FIG. 4 only by way of example 120 as an example. FIG. 4 illustrates a block diagram 400 of a relationship between a hierarchical structure and paragraphs of an electronic book according to some implementations of the present disclosure.

In the case where the block marks 320 and 322 have been identified, the block node 210 shown in FIG. 4 may be generated for the paragraph 120, and the block node 210 may point to the paragraph 120. BLOCKID: 0 may be set for the block node 210. It will be understood that although the serial number "0" is used here as the starting number of the identifier, according to an example implementation of the present disclosure, other formats (for example, "1") may be used to represent the first BLOCKID, and the subsequent BLOCKID may be determined in an incremental manner.

Further, each element in the paragraph 120 may be processed one by one. Returning to FIG. 3, the content of the block range 330 may be analyzed line by line. For example, a first line "地球" of the block range 330 represents a text element, at which point a text element "地球" is detected within the block range 330, and the text sub node 220 pointing to the text element 130 "地球" may be generated. In turn, how to link the text sub node 220 to the block node 210 is determined based on the position of the text element 130 within the block range 330. Since the text element is the first element detected in the block range 330, the text sub node 220 may be used as the first sub node of the block node 210. In other words, the second-level identifier of the text sub node 220 may be set as SUBID: 0. With the example implementation of the present disclosure, the text element in the paragraph can be quickly and accurately identified by scanning the content of the block range 330 in the electronic book 310.

It will be understood that in the context of the present disclosure, a text element may include one or more characters. For example, if a paragraph includes only a text element but does not include a non-text element, all text in paragraph 120 may be used as a text element at this point. For another example, if a paragraph includes a text element and a non-text element that appear alternately, a non-text element may be used to determine a boundary of the text element. Specifically, in the example of FIG. 1, the first text element 130 includes a portion from the beginning of the paragraph to the non-text element 140, the second text element 132 includes a portion between the non-text elements 140 and 142, and the third text element 134 includes a portion between the non-text element 142 and the end of the paragraph.

According to an example implementation of the present disclosure, if it is determined that the text element includes a plurality of consecutive characters, a corresponding character sub node may be further generated for each character. In this way, each character in the text element can be distinguished at a finer granularity, thereby providing a higher control granularity for subsequent processing. Specifically, for a given character of a plurality of consecutive characters, a character sub node pointing to the given character may be generated. Referring to FIG. 4, at a third level of the hierarchical structure 200, a corresponding character sub node 230 may be generated for a first character "地" in the text element 130, and a corresponding character sub node 232 may be generated for a second character "球" in the text element 130.

Further, the character sub nodes 230 and 232 may be linked to the text sub node 220 based on an offset of each character in the text element 130. For example, "地" is the first character in the text element 130, and the offset of "地" may be set as OFFSET: 0. The character sub node 230 may be taken as the first sub node of the text sub node 220, and the character "地" may be represented with a three-level identifier (BLOCKID: 1, SUBID: 0, OFFSET: 0). Similarly, " 球 " is the second character in the text element 130, and the offset of " 球 " may be set as OFFSET: 1. At this point, the character sub node 232 may be used as the second sub node of the text sub node 220, and the character " 球 " may be represented by using a three-level identifier (BLOCKID: 1, SUBID: 0, OFFSET: 1). At this point, the sub node may inherit the first level and the second level identifier of its parent node and add the third level identifier after the identifier of the parent node.

It will be understood that only the text element 130 is used as a specific example to describe how to process each character of the text element 130. If the text element includes more characters, each character may be processed one by one in a similar manner to generate a corresponding character sub node for each character in the text element 130. With example implementations of the present disclosure, each character in an electronic book may be identified in an accurate and effective manner. Even if the reader selects only one character of the text elements, the selected character may be uniquely determined based on the three-level identifier of the character. In this way, a more accurate identification manner can be provided for subsequent processing.

According to an example implementation of the present disclosure, the subsequent content of the block range 330 may be continuously scanned. For example, the second line content "<IMG SRC= . . . >" of the block range 330 may continue to be scanned. The second line represents inserting the non-text element 140 (i.e., an earth image) into the display page of the electronic book. At this point, it may be determined that the non-text element 140 is detected within the block range 330, and the non-text sub node 222 that points to the non-text element 140 may be generated. Further, the position of the non-text element 140 within the block range 330 may be determined. It will be appreciated that non-text element 140 follows the text element 130 and is the second element of the paragraph 120. At this point, the non-text sub node 220 may be used as the second sub node of the block node 210 and is linked to the block node 210. Further, the non-text sub node 222 is at the second level, and it can be determined that the identifier of the non-text sub node 222 is (BLOCKID: 1, SUBID: 1).

According to an example implementation of the present disclosure, to represent each element by using a uniform three-level identifier, the image sub node 234 may be inserted into the lower layer of the non-text sub node 222 to point to the non-text element 140. Since the non-text element 140 includes only a single image or video, the offset of the non-text element 140 may be set as "NO OFFSET". For example, a "0" (or other value, such as −1) may be used to represent NO OFFSET, at which point the offset of non-text element 140 is OFFSET: 0. As described in FIG. 4, the image sub node 234 points to the non-text element 140, and the three-level identifier of the non-text element 140 may be (BLOCKID: 1, SUBID: 1, OFFSET: 0). According to one example implementation of the present disclosure, various types of elements may be identified in a format of a uniform three-level identifier. In this manner, various types of elements may be managed in a unified manner in subsequent operations.

It will be understood that although a static image is taken as an example of the non-text element, according to an example implementation of the present disclosure, the non-text element may further include a dynamic image and/or a video. For example, the non-text element 140 may be a dynamic image displaying a rotating earth or may be other video. At this point, the content of the block range 330 may be analyzed in a similar manner, and a corresponding non-text sub node is generated based on identifying the dynamic image and/or video. Further, the corresponding dynamic image sub node or video sub node may be created on the lower layer of the non-text sub node, and then the dynamic image or video may be identified in the format of the third-level identifier. At this point, the first two levels of the three-level identifier may inherit the identifier of the non-text sub node, and the third layer identifier may be set as OFFSET: 0.

It will be appreciated that while text elements are processed first, and non-text elements are post-processed are described above. According to an example implementation of the present disclosure, the processing order may be determined based on a type of a specific element included in the paragraph. Assuming the paragraph header includes a non-text element, and the text element follows the non-text element, then the non-text element may be processed first, and a corresponding non-text sub node is generated, which in turn processes the text element and generates a corresponding text sub node. According to an example implementation of the present disclosure, for the case where text element and the non-text element appear alternately, the elements may be processed one by one in a similar manner as described above until the end of the paragraph is reached.

According to an example implementation of the present disclosure, the subsequent content of the block range 330 may continue to be processed. For example, the third line of the block range 330 relates to the text element 132 " 围绕太阳", the fourth line relates to the non-text element 142 (i.e., the sun image), the fifth line relates to the text element 134 " 旋转。" at which point the corresponding sub node may be generated for the elements described above, and the corresponding sub node is inserted into the hierarchical structure 200 based on the position of each element.

In the following, more details regarding the hierarchical structure are described with reference to FIG. 5, which illustrates a block diagram 500 of a hierarchical structure for managing an element in an electronic book according to some implementations of the present disclosure. The third through fifth lines within the block range 330 may be processed in the manner described above. Specifically, a text sub node 510 directed to the text element 132 may be generated (the second level identifier is (BLOCKID: 1, SUBID: 2)), a non-text sub node 512 directed to the non-text element 142 may be generated (the second level identifier is (BLOCKID: 1, SUBID: 3)), and a text sub node 514 directed to the text element 134 may be generated (the second level identifier is (BLOCKID: 1, SUBID: 4)).

Figure 5:
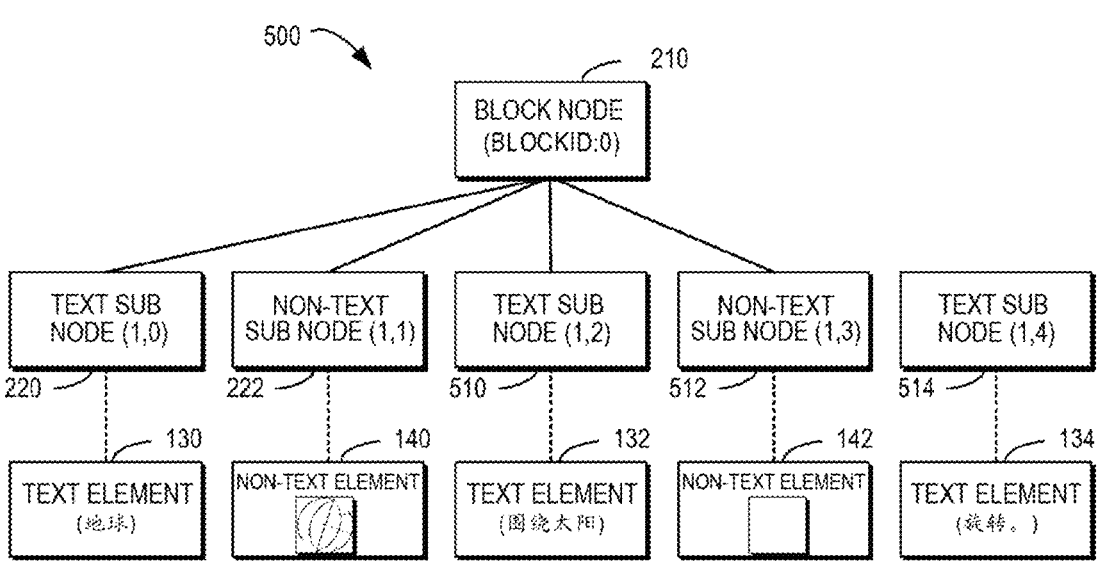
FIG. 5 illustrates a block diagram of a hierarchical structure for managing an element in an electronic book according to some implementations of the present disclosure.

For simplification purposes, the third level sub node is not shown in the hierarchical structure of FIG. 5, and the character sub nodes of text sub nodes 510 and 514 may be determined based on the manner described above. For example, the text sub node 510 may include four character sub nodes that point to four characters "围", "绕", "太", "阳", respectively, and the text sub node 514 may include three character sub node a point to three characters " 旋", " 转" and "。", respectively. The three-level identifier of each character may be determined one by one based on the method described above, and details are not described herein again.

It will be understood that, although the paragraph 120 is only used as an example to describe the specific steps of processing a plurality of elements in one paragraph. According to one example implementation of the present disclosure, a similar process may be performed for each paragraph in the electronic book to manage each element in the electronic book with a globally unique three-level identifier. Assuming that the electronic book includes N paragraphs, for a plurality of elements in the second paragraph, the BLOCKID of these elements may be set as BLOCKID: 1. The second level identifier SUBID and the third level identifier OFFSET of each element may be determined using the methods described above. As another example, for a plurality of elements in the N$^{th}$ paragraph, the BLOCKID of these elements may be set as BLOCKID: N−1. At this point, the tree structure shown in FIG. 5 may include more block nodes, and each block node may have a same parent node. In this way, the tree structure may identify various elements in the electronic book.

It will be appreciated that while the figures illustrate hierarchical structures between various node in a tree structure, alternatively and/or additionally, the hierarchical structure described above may be stored in other manner. For example, a first-level linked list storage block node 210 may be used, a second-level linked list may be used to store the text sub node 220 and the non-text sub node 222, and character sub nodes 230 and 232 may be stored in a three-level linked list.

Figure 6:
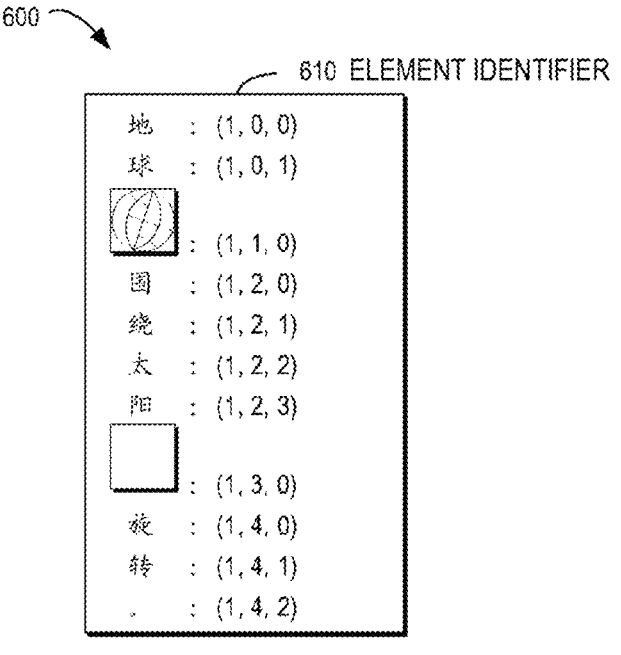
FIG. 6 illustrates a block diagram of identifiers of elements in an electronic book according to some implementations of the present disclosure.

FIG. 6 illustrates a block diagram 600 of identifiers of elements in an electronic book according to some implementations of the present disclosure. As shown in FIG. 6, an element identifier 610 illustrates an identifier for each element in the paragraph 120. The three-level identifier may be stored in a ternary format (BLOCKID, SUBID, OFFSET). At this point, the three dimensions in the ternary respectively represent: a block identifier, a sub-block identifier, and an offset. For example, the three-level identifier of the character "地" may be represented as (1, 0, 0), the three-level identifier of the sun image may be represented as (1, 3, 0), and so on.

With example implementations of the present disclosure, it is not necessary to distinguish the types of elements in an electronic book and may uniquely point to various elements in the electronic book in a unified three-level identifier. Further, each element in the electronic book may be managed with a three-level identifier format. It will be understood that although the above stores a three-level identifier in accordance with a direction from a root node to a leaf node of the tree structure, according to one example implementation of the present disclosure, the three-level identifier may also be stored in other orders. For example, the three-level identifier may be stored in accordance with an order of (OFFSET, SUBID, BLOCKID). In this way, a more flexible expression can be provided.

According to one example implementation of the present disclosure, during reading of the electronic book, the reader may select the desired one or more elements in the display page of the electronic book. More examples of managing elements with a three-level identifier are described below with reference to FIG. 7. FIG. 7 illustrates a block diagram 700 of a process for determining a reader selection element according to some implementations of the present disclosure. As shown in FIG. 7, the reader may select one or more elements in the display page 710 by drawing a line. At this point, the screen coordinates of the drawing action in the display page may be detected. Further, which element(s) are selected may be determined based on the screen coordinates and a mapping relationship between a plurality of elements in the display page 710.

It will be understood that the position of each element in the display page 710 may be affected by various factors. For example, the larger the resolution used to display the electronic book, more lines may be displayed in the display page 710, and more elements may be displayed per line. For another example, the larger the font size for displaying the text element is, the smaller the displayed element is, and vice versa. For another example, the font used to display the text element also affects the position of the text element. Further, factors such as margins and line spacing may also affect the display position of the elements. Thus, the mapping relationship between the screen coordinates and the plurality of elements in the display page 710 may be determined based on one or more of the factors described above.

The one or more elements selected by the reader may be determined based on the screen coordinates of the line drawing by the user and the mapping relationship. Further, the selected elements may be recorded based on the hierarchical structure described above. Specifically, as shown in FIG. 7, the user selects the earth image, the text "围绕太阳" and the sun image, and at this point, a list 720 may be used to represent the selected element. Specifically, the list 720 indicates that the user selects the earth image with the identifier (1, 1, 0), the text "围绕太阳" (the identifiers of the characters are (1, 2, 0), (1, 2, 1), (1, 2, 2), and (1, 2, 3) respectively), and the sun image with the identifier of (1, 3, 0). With example implementations of the present disclosure, the selected elements may be recorded with a uniform three-level identifier. In this way, the selected elements may be further processed based on the content of the list 720.

According to one example implementation of the present disclosure, an association relationship may be established between the reader's actions and the list 720 to process the reader's further operation. For example, the reader may copy the selected element, may add an annotation to the selected element, and so on. In this way, the list 720 may accurately record which elements the reader will perform subsequent operations as a basis for subsequent operations.

It will be appreciated that although the specific process for managing an element in an electronic book is described above in Chinese as an example. The technical solutions described above may also be applied to electronic books in other languages. For example, in a language environment such as English and French, the text element may include one or more consecutive words, and at this point, one word corresponds to one Chinese character described above. In this manner, a method according to one example implementation of the present disclosure may be used in a multilingual environment, and a unified element management approach is provided for electronic books written in multiple languages.

Example Processes

FIG. 8 shows a flowchart of a method 800 for managing an element in an electronic book according to some implementations of the present disclosure. Specifically, at block 810, a block node is generated based on a paragraph in the electronic book, the paragraph comprises at least one element, and the at least one element is comprised at least one of a text element or a non-text element. At block 820, a text sub node of the block node is generated based on a text element included in the paragraph, and the text element includes at least one character. At block 830, a non-text sub node of the block node is generated based on a non-text element included in the paragraph. At block 840, hierarchical structure for identifying the at least one element is generated based on the block node, the text sub node, and the non-text sub node.

According to an example implementation of the present disclosure, generating the block node based on the paragraph in the electronic book includes: in response to detecting a block marker in the electronic book, identifying a content in a block range corresponding to the block marker as the paragraph; and generating the block node pointing to the paragraph.

According to an example implementation of the present disclosure, generating the text sub node of the block node based on the text element comprised in the paragraph includes: in response to detecting the text element from the block range, generating the text sub node pointing to the text element; and linking the text sub node to the block node based on a position of the text element in the block range.

According to an example implementation of the present disclosure, the method further includes: in response to determining that the text element comprises a plurality of consecutive characters, generating, for a given character of the plurality of consecutive characters, a character sub node pointing to the given character; and linking the character sub node to the text sub node based on an offset of the given character in the text element.

According to an example implementation of the present disclosure, the method further includes: identifying the given character with the block node, the text sub node, and the offset in the hierarchical structure.

According to an example implementation of the present disclosure, generating the non-text sub node of the block node based on the non-text element comprised in the paragraph includes: in response to detecting the non-text element from the block range, generating the non-text sub node pointing to the non-text element; and linking the non-text sub node to the block node based on a position of the non-text element in the block range.

According to an example implementation of the present disclosure, the method further includes: identifying the non-text element with the block node, the non-text sub node, and an offset of the non-text element in the hierarchical structure, the offset of the non-text element being set as NO OFFSET.

According to an example implementation of the present disclosure, the non-text element comprises at least one of an image or a video.

According to an example implementation of the present disclosure, the method further includes: in response to receiving a selection action in a display page of the electronic book, determining a selected element in the at least one element based on a coordinate of the selection action in the display page and a mapping relationship between the coordinate and the at least one element; and recording the selected element based on the hierarchical structure.

According to an example implementation of the present disclosure, the mapping relationship is determined based on at least one of: a resolution, a font size, a font, a margin, or a line spacing for displaying the electronic book.

Example Apparatus and Apparatus

Figure 9:
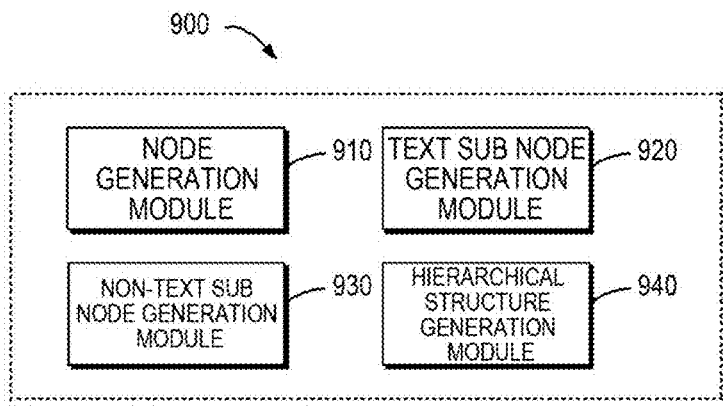
FIG. 9 illustrates a block diagram of an apparatus for managing an element in an electronic book according to some implementations of the present disclosure.

FIG. 9 shows a block diagram 900 of an apparatus for managing an element in an electronic book according to some implementations of the present disclosure. The apparatus 900 includes: a node generation module 910 configured to generate a block node based on a paragraph in the electronic book, the paragraph comprising at least one element, the at least one element comprising at least one of a text element or a non-text element; a text sub node generation module 920 configured to generate a text sub node of the block node based on a text element comprised in the paragraph, the text element comprising at least one character; a non-text sub node generation module 930 configured to generate a non-text sub node of the block node based on a non-text element comprised in the paragraph; and a hierarchical structure generation module 940 configured to generate a hierarchical structure for identifying the at least one element based on the block node, the text sub node, and the non-text sub node.

According to an example implementation of the present disclosure, the node generating module 910 includes: an identification module configured to, in response to detecting a block marker in the electronic book, identify a content in a block range corresponding to the block marker as the paragraph; and a generation module configured to generate the block node pointing to the paragraph.

According to an example implementation of the present disclosure, the text sub node generating module 920 includes: a pointing module configured to, in response to detecting the text element from the block range, generate the text sub node pointing to the text element; and a linking module configured to link the text sub node to the block node based on a position of the text element in the block range.

According to an example implementation of the present disclosure, the apparatus 900 further includes: a character node generation module configured to, in response to determining that the text element comprises a plurality of consecutive characters, generate, for a given character of the plurality of consecutive characters, a character sub node pointing to the given character; and an offset module configured to link the character sub node to the text sub node based on an offset of the given character in the text element.

According to an example implementation of the present disclosure, the apparatus 900 further includes: a character identifying module configured to identify the given character with the block node, the text sub node, and the offset in the hierarchical structure.

According to an example implementation of the present disclosure, the non-text sub node generating module 930 includes: a pointing module configured to, in response to detecting the non-text element from the block range, generate the non-text sub node pointing to the non-text element; and a linking module configured to link the non-text sub node to the block node based on a position of the non-text element in the block range.

According to an example implementation of the present disclosure, the apparatus 900 further includes: a non-text identification module configured to identify the non-text element with the block node, the non-text sub node, and an offset of the non-text element in the hierarchical structure, the offset of the non-text element being set as NO OFFSET.

According to an example implementation of the present disclosure, the apparatus 900 further includes: a selecting module configured to, in response to receiving a selection action in a display page of the electronic book, determine a selected element in the at least one element based on a coordinate of the selection action in the display page and a mapping relationship between the coordinate and the at least one element; and a recording module configured to record the selected element based on the hierarchical structure.

According to an example implementation of the present disclosure, the non-text element includes at least one of an image or a video.

According to an example implementation of the present disclosure, the mapping relationship is determined based on at least one of: a resolution, a font size, a font, a margin, or a line spacing for displaying the electronic book.

Figure 10:
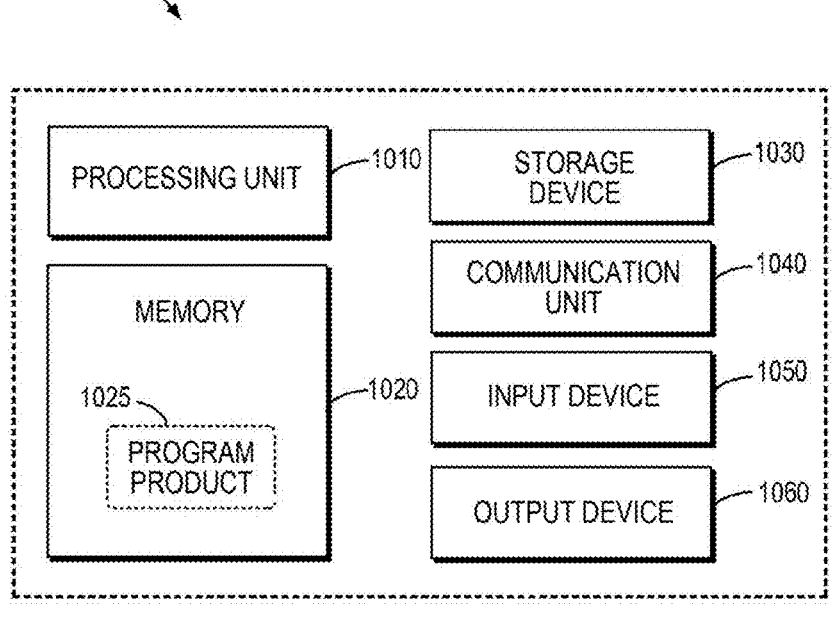
FIG. 10 illustrates a block diagram of a device capable of implementing various implementations of the present disclosure.

FIG. 10 illustrates a block diagram of a device 1000 capable of implementing multiple implementations of the disclosure. It should be understood that the computing device 1000 shown in FIG. 10 is merely example and should not constitute any limitation on the functionality and scope of the implementations described herein. The computing device 1000 shown in FIG. 10 may be used to implement the methods described above.

As shown in FIG. 10, the computing device 1000 is in the form of a general computing device. The components of computing device 1000 may include, but are not limited to, one or more processors or processing units 1010, a memory 1020, a storage device 1030, one or more communication units 1040, one or more input devices 1050, and one or more output devices 1060. The processing unit 1010 may be an actual or virtual processor and can execute various processes based on the programs stored in the memory 1020. In a multiprocessor system, multiple processing units execute computer executable instructions in parallel to improve the parallel processing capability of the computing device 1000.

The computing device 1000 typically includes multiple computer storage medium. Such medium may be any available medium that is accessible to the computing device 1000, including but not limited to volatile and non-volatile medium, removable and non-removable medium. The memory 1020 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 1030 may be any removable or non-removable medium, and may include a machine readable medium such as a flash drive, a disk, or any other medium, which may be used to store information and/or data (such as training data for training) and may be accessed within computing device 1000.

The computing device 1000 may further include additional removable/non-removable, volatile/non-volatile storage medium. Although not shown in FIG. 10, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 1020 may include a computer program product 1025, which has one or more program units configured to execute various methods or acts of various implementations of the present disclosure.

The communication unit 1040 communicates with a further computing device through the communication medium. In addition, functions of components in the computing device 1000 may be implemented by a single computing cluster or multiple computing machines, which can communicate through a communication connection. Therefore, the computing device 1000 may be operated in a networking environment using a logical connection with one or more other servers, a network personal computer (PC), or another network node.

The input device 1050 may be one or more input devices, such as a mouse, a keyboard, a trackball, etc. The output device 1060 may be one or more output devices, such as a display, a speaker, a printer, etc. The computing device 1000 may also communicate with one or more external devices (not shown) through the communication unit 1040 as required. The external device, such as a storage device, a display device, etc., communicate with one or more devices that enable users to interact with the computing device 1000, or communicate with any device (for example, a network card, a modem, etc.) that makes the computing device 1000 communicate with one or more other computing devices. Such communication may be executed via an input/output (I/O) interface (not shown).

According to the example implementations of the present disclosure, a computer-readable storage medium is provided, on which a computer-executable instruction or computer program is stored, wherein the computer-executable instructions is executed by the processor to implement the method described above. According to the example implementations of the present disclosure, a computer program product is also provided. The computer program product is physically stored on a non-transient computer-readable medium and includes computer-executable instructions, which are executed by the processor to implement the method described above. According to the example implementations of the present disclosure, a computer program product is provided having stored thereon a computer program, and when the program is executed by a processor, the method described above is implemented.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be executed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that executes the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

We claim:

1. A method of managing an element in an electronic book, comprising:
    establishing, by an electronic device, a block node based on a paragraph in the electronic book, the paragraph comprising at least one element, the at least one element comprising at least one of a text element or a non-text element;
    establishing, by an electronic device, a text sub node of the block node based on a text element comprised in the paragraph, the text element comprising at least one character;
    establishing, by an electronic device, a non-text sub node of the block node based on a non-text element comprised in the paragraph, wherein the non-text element is identified with the block node, the non-text sub node, and an offset of the non-text element;
    generating, by the electronic device, a hierarchical structure for identifying the at least one element based on the block node, the text sub node, and the non-text sub node;
    in response to receiving a selection action in a display page of the electronic book, determining a selected element in the at least one element based on a coordinate of the selection action in the display page and a mapping relationship between the coordinate and the at least one element; and
    recording the selected element based on the hierarchical structure.

2. The method of claim 1, wherein generating the block node based on the paragraph in the electronic book comprises:
    in response to detecting a block marker in the electronic book, identifying a content in a block range corresponding to the block marker as the paragraph; and
    generating the block node pointing to the paragraph.

3. The method of claim 2, wherein generating the text sub node of the block node based on the text element comprised in the paragraph comprises: in response to detecting the text element from the block range,
    generating the text sub node pointing to the text element; and
    linking the text sub node to the block node based on a position of the text element in the block range.

4. The method of claim 3, further comprising: in response to determining that the text element comprises a plurality of consecutive characters,
    generating, for a given character of the plurality of consecutive characters, a character sub node pointing to the given character; and
    linking the character sub node to the text sub node based on an offset of the given character in the text element.

5. The method of claim 4, further comprising: identifying the given character with the block node, the text sub node, and the offset in the hierarchical structure.

6. The method of claim 1, wherein generating the non-text sub node of the block node based on the non-text element comprised in the paragraph comprises: in response to detecting the non-text element from the block range,
    generating the non-text sub node pointing to the non-text element; and
    linking the non-text sub node to the block node based on a position of the non-text element in the block range.

7. The method of claim 6, wherein the offset of the non-text element is set as NO OFFSET.

8. The method of claim 1, wherein the non-text element comprises at least one of an image or a video.

9. The method of claim 1, wherein the mapping relationship is determined based on at least one of: a resolution, a font size, a font, a margin, or a line spacing for displaying the electronic book.

10. An electronic device comprising:
    at least one processing unit; and
    at least one memory coupled to the at least one processing unit and storing instructions for execution by the at least one processing unit, the instructions, when executed by the at least one processing unit, causing the electronic device to perform acts for managing an element in an electronic book, the acts comprising:
    establishing, by an electronic device, a block node based on a paragraph in the electronic book, the paragraph comprising at least one element, the at least one element comprising at least one of a text element or a non-text element;
    establishing, by an electronic device, a text sub node of the block node based on a text element comprised in the paragraph, the text element comprising at least one character;
    establishing, by an electronic device, a non-text sub node of the block node based on a non-text element comprised in the paragraph, wherein the non-text element is identified with the block node, the non-text sub node, and an offset of the non-text element;
    generating, by the electronic device, a hierarchical structure for identifying the at least one element based on the block node, the text sub node, and the non-text sub node;
    in response to receiving a selection action in a display page of the electronic book, determining a selected element in the at least one element based on a coordinate of the selection action in the display page and a mapping relationship between the coordinate and the at least one element; and
    recording the selected element based on the hierarchical structure.

11. The device of claim 10, wherein generating the block node based on the paragraph in the electronic book comprises:
    in response to detecting a block marker in the electronic book, identifying a content in a block range corresponding to the block marker as the paragraph; and generating the block node pointing to the paragraph.

12. The device of claim 11, wherein generating the text sub node of the block node based on the text element comprised in the paragraph comprises: in response to detecting the text element from the block range, generating the text sub node pointing to the text element; and linking the text sub node to the block node based on a position of the text element in the block range.

13. The device of claim 12, wherein the acts further comprise: in response to determining that the text element comprises a plurality of consecutive characters, generating, for a given character of the plurality of consecutive characters, a character sub node pointing to the given character; and linking the character sub node to the text sub node based on an offset of the given character in the text element.

14. The device of claim 13, wherein the acts further comprise: identifying the given character with the block node, the text sub node, and the offset in the hierarchical structure.

15. The device of claim 10, wherein generating the non-text sub node of the block node based on the non-text element comprised in the paragraph comprises: in response to detecting the non-text element from the block range, generating the non-text sub node pointing to the non-text element; and linking the non-text sub node to the block node based on a position of the non-text element in the block range.

16. The device of claim 15, wherein the offset of the non-text element is set as NO OFFSET.

17. The device of claim 10, wherein the mapping relationship is determined based on at least one of: a resolution, a font size, a font, a margin, or a line spacing for displaying the electronic book.

18. A non-transitory computer readable storage medium having stored thereon a computer program which, when executed by a processor, causes the processor to implement acts for managing an element in an electronic book, the acts comprising:

establishing, by an electronic device, a block node based on a paragraph in the electronic book, the paragraph comprising at least one element, the at least one element comprising at least one of a text element or a non-text element;

establishing, by an electronic device, a text sub node of the block node based on a text element comprised in the paragraph, the text element comprising at least one character;

establishing, by an electronic device, a non-text sub node of the block node based on a non-text element comprised in the paragraph, wherein the non-text element is identified with the block node, the non-text sub node, and an offset of the non-text element;

generating, by the electronic device, a hierarchical structure for identifying the at least one element based on the block node, the text sub node, and the non-text sub node;

in response to receiving a selection action in a display page of the electronic book, determining a selected element in the at least one element based on a coordinate of the selection action in the display page and a mapping relationship between the coordinate and the at least one element; and recording the selected element based on the hierarchical structure.

*   *   *   *   *